INVENTORS
YOSHIMITSU UTO
TAIZO YAMAZAKI
BY TOSHIKAZU SHINKAWA

McGlew & Toren
ATTORNEYS

United States Patent Office 3,461,917
Patented Aug. 19, 1969

3,461,917
PRESSURE VESSEL WITH LAMINATED PLATE
WALL FOR USE WITH HYDROGEN
Yoshimitsu Uto, Taizo Yamazaki, and Toshikazu Shinkawa, Hiroshima-ken, Japan, assignors to Mitsubishi Jukogyo Kabushiki Kaisha, Chiyoda-ku, Tokyo, Japan
Filed Feb. 28, 1967, Ser. No. 619,243
Int. Cl. F16l 9/02, 9/18, 9/22
U.S. Cl. 138—143
4 Claims

ABSTRACT OF THE DISCLOSURE

A pressure vessel for use in association with a hydrogen atmosphere comprises an inner shell and an outer shell of relatively great thickness and an intermediate laminate of a plurality of tubular elements or plates which are welded together along longitudinally extending welding seams. The tubular shell on the side of the vessel which is to be exposed to hydrogen is made of a hydrogen-resistant material. A vent hole is defined through the laminate of plates to provide for the pressure equalization. A backing plate is located between the laminate plates and the shell plate which is to be exposed to the hydrogen atmosphere and separates the weld material of the adjacent plate of the laminate from the shell plate and prevents the fusing of the weld material to the shell plate.

SUMMARY OF THE INVENTION

This invention relates, in general, to the construction of containers or pressure vessels and, in particular, to a new and useful pressure vessel formed by a laminate of a plurality of concentrically arranged cylindrically formed plate members which are welded along longitudinally extending welding seams and which is resistant to hydrogen attack.

Hydrogen embrittlement of pressure vessels because of the handling of high pressure and high temperature hydrogen gas can be precluded if all of the steel materials employed in fabricating the vessels are replaced by hydrogen-resistant alloy steels which are capable of resisting attacks by hydrogen gas at elevated temperatures and pressures. However, such hydrogen-resistant steel is expensive and requires great technical skill in its heat treatment, welding and other working which makes the materials very expensive to manufacture and use. On first hand, it would appear that the cost of manufacturing such vessels could be materially reduced by fabricating only the inner cylinder of a laminated pressure container with a steel which is resistant to hydrogen and using a less expensive steel on the outer layers. It was found, however, that the outer layers at locations adjacent the welded joints tend to become subjected, together with the weld metal deposit, to hydrogen embrittlement. The reason for this is that the weld metal tends to absorb the hydrogen gas and distribute it to the laminated plate structure.

In accordance with the present invention, there is provided a pressure vessel having walls made up of a plurality of concentrically arranged plates forming a tubular laminate structure with the plates of the walls being welded along longitudinally extending welding seams, the welding metal of the seams being maintained out of contact with the inner plate which is exposed to hydrogen so that there will be a lessening of the possibility of the permeation of the hydrogen to the laminate plates of the laminate structure.

Accordingly, it is an object of the invention to provide a pressure vessel made with a plurality of laminated walls wherein the layers of the laminate include curved plates which are welded along longitudinally extending seam lines and wherein the vessel is not subject to the deleterious effects of hydrogen, even though inexpensive materials are used for some of the plates of the laminate structure.

A further object of the invention is to provide a pressure vessel including a plurality of curved plates built into a laminate structure over an inner cylinder and wherein each of the plates is welded along a longitudinally extending seam line and wherein the weld metal of the seam of the plate adjacent the wall of the vessel which would be exposed to hydrogen is constructed to be out of contact with this wall.

A further object of the invention is to provide a pressure vessel which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Detailed description

Figure 1:
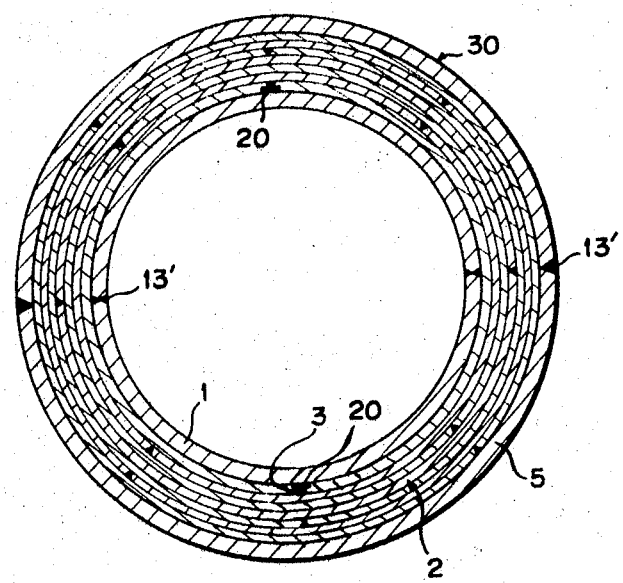
FIG. 1 is a sectional view of a pressure vessel constructed in accordance with the invention.

Referring to the drawings, in particular, the invention embodied therein comprises a pressure vessel generally designated 30 which in accordance with the invention is formed of a laminate including centrally arranged inner and outer cylinders 1 and 5 and a central plate laminate cylinder generally designated 2, each cylinder being formed of a plurality of plates, which are welded together along longitudinally extending weld seams 3. The inner and outer cylinders 1 and 5 are formed by two curved half plates which are welded together along longitudinally extending welding lines or seams 13.

Figure 2:
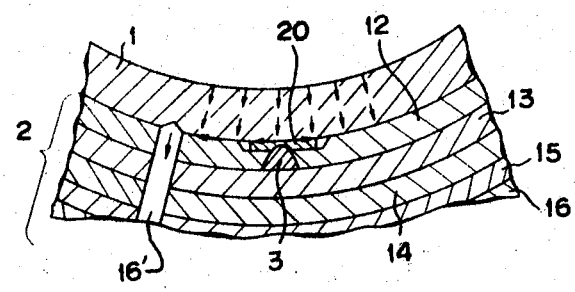
FIG. 2 is an enlarged detailed sectional view of a portion of the vessel indicated in FIG. 1.

As indicated in FIG. 2, in accordance with the invention the lamina structure 2 may advantageously comprise plates or layers 12, 13, 14, 15, 16, etc. which are made of a relatively inexpensive steel material which does not have any particular hydrogen-resistant characteristics. In order to insure that the plates are not subjected to hydrogen attack by the concentrating of the hydrogen by the weld material, the lamina plate 12 which is adjacent the interior wall 1 which will be subjected to the hydrogen atmosphere on its inner surface is formed by bonding the individual plate elements making up this layer with weld material along a welding seam 3 which is spaced away from the surface of the plate 1. This is accomplished by employing a backing strip 20 between the plate 12 and the interior cylinder 1 when the lamina layer 12 is formed. A pressure equalizing or detection hole 16' is made to extend through all of the laminate structure 2 and the exterior cylinder 5 to provide a communication between the space between plates 1 and 12 and the exterior of the vessel. When the hydrogen and gas is arranged at the interior of the vessel and is maintained at high pressure and high temperature, part of the gas will be absorbed by the surface of the steel forming the inner cylinder that will become diffused into the steel as indicated by the arrows in FIG. 2. This hydrogen penetrates the inner cylinder 1 and is precipitated in the space between the cylinder and the laminate plate 12 and will flow out of the container through the detection hole 16', as indicated by the arrow in FIG. 2. Thus, the pressure in the space is kept from rising above atmospheric pressure and therefore the lamina plates 12 are not embrittled by hydrogen. The deposited metal 3 on the innermost lamina plate 12 which is adjacent the inner cylinder 1 is not welded to the plate or is welded on a backing strip 20 by intermittent welding in order to provide a space between the lamina plate 12 and the inner cylinder 1 so that the material of the welded joint 3 will not contact the inner cylinder 1. Therefore, all of the hydrogen which has been absorbed by the surface of the inner cylinder 1 will be diffused through the cylinder 1 and deposited in the space formed between the laminate plate 12 and the inner cylinder 1. Since the pressure is kept below atmospheric because of the pressure equalizing hole 16, the hydrogen partial pressure in the space will not rise above the atmospheric pressure and the lamina plate 12 will be completely protected against hydrogen embrittlement.

Although the weld joints of each lamina plate are indicated as being longitudinally extending welds, it should be appreciated that a continuous weld may be formed along the edge of a spirally wound continuous plate which forms all of the lamina layers if so desired.

The backing strip 20 may be made of a carbon steel or a steel resistant to hydrogen.

The term "carbon steel" is used herein to describe steel generally which is manufactured without consideration for hydrogen resistance. It is therefore not limited to pure carbon steel but may include low alloy steel and high tension steel. In addition, the term "hydrogen-resistant steel" is used to designate steel made by adding not less than 0.1% of chromium and/or molybdenum and one or more other known elements to steel to prevent or minimize the impairment of steel due to contact with hydrogen at elevated pressures and temperatures.

While a specific embodiment of the invention has been shown and described in detail to illustrate the application of the inventive principles, it will be understood that the invention may be embodied otherwise without departing from such principles.

What is claimed is:

1. A pressure vessel for use in association with a hydrogen atmosphere comprising a laminate of plates formed into concentrically arranged tubular elements, each of said plates being welded along a generally longitudinally extending welding seam, a tubular shell plate on the side of said vessel which is to be exposed to a hydrogen atmosphere being made of a hydrogen-resistant material, a vent hole defined through said laminate of plates, and a backing plate located between said laminate of plates and said shell plate and separating the hydrogen-resistant material shell plate from the weld material of the next adjacent plate and preventing fusing of the weld material to said shell plate by the hydrogen and in order to hinder hydrogen attack on the remaining lamina plates, the plate of said laminate of plates which is nearest to the shell exposed to hydrogen atmosphere is provided with a recess surrounding the longitudinal weld, said backing plate being disposed in the recess.

2. Pressure vessel, according to claim 1, wherein said backing plate is disposed flush with the surface of the plate of said laminate of plates which is nearest to the shell exposed to hydrogen atmosphere.

3. A pressure vessel according to claim 1, wherein each of said lamina layers comprises at least two plates which are welded together along radially spaced longitudinally extending welding seams, the weld material of each of the seams of the plate adjacent the hydrogen-resistant material plate being shielded from the hydrogen-resistant material plate by a backing strip.

4. A pressure vessel, according to claim 1, including a tubular shell on the interior and exterior of said laminate of plates, each of said shells being of a thickness which is greater than that of each of the plates of said laminate of plates.

References Cited

UNITED STATES PATENTS 3,224,619 12/1965 Maurin et al. _____ 220—3
3,231,338 1/1966 Andrus _____ 220—3 XR LOUIS K. RIMRODT, Primary Examiner U.S. Cl. X.R.

220—3